United States Patent
Kuras et al.

(10) Patent No.: US 9,986,715 B2
(45) Date of Patent: Jun. 5, 2018

(54) ULTRA LIGHTWEIGHT CLAY AND POLYMER HIGH PERFORMANCE CLUMPING CAT LITTER

(71) Applicant: Oil-Dri Corporation of America, Chicago, IL (US)

(72) Inventors: Monika Kuras, Chicago, IL (US); Donata Ostapyshyn, Mount Prospect, IL (US); Tarik Alami, Laval (CA)

(73) Assignee: Oil-Dri Corporation of America, Chicago, IL (US)

( * ) Notice: Subject to any disclaimer, the term of this patent is extended or adjusted under 35 U.S.C. 154(b) by 0 days. days.

(21) Appl. No.: 14/823,398

(22) Filed: Aug. 11, 2015

(65) Prior Publication Data

US 2016/0044891 A1   Feb. 18, 2016

Related U.S. Application Data

(60) Provisional application No. 62/036,327, filed on Aug. 12, 2014.

(51) Int. Cl.
*A61K 9/00* (2006.01)
*A01K 1/015* (2006.01)

(52) U.S. Cl.
CPC .......... *A01K 1/0155* (2013.01); *A01K 1/0154* (2013.01)

(58) Field of Classification Search
CPC .................................................. A01K 1/0155
See application file for complete search history.

(56) References Cited

U.S. PATENT DOCUMENTS

| | | | |
|---|---|---|---|
| 5,339,769 A | 8/1994 | Toth et al. | |
| 7,757,638 B2 | 7/2010 | Wang et al. | |
| 8,720,375 B2 | 5/2014 | Miller et al. | |
| 2007/0289543 A1 | 12/2007 | Petska et al. | |
| 2013/0220227 A1 | 8/2013 | Hecking | |

FOREIGN PATENT DOCUMENTS

WO    2014/036093    3/2014

OTHER PUBLICATIONS

International Search Report and Written Opinion of the International Searching Authority dated Nov. 5, 2015, which issued during prosecution of International Application No. PCT/US2015/044605.

*Primary Examiner* — Paul W Dickinson
(74) *Attorney, Agent, or Firm* — Vedder Price P.C.; Deborah L. Lu; Mark W. Russell

(57) ABSTRACT

This invention relates to a formulation and process for making a lightweight, clumping absorbent material with virtually no dust, low tracking, superior clumping and odor control. The formulations described herein may utilize a tackifying agent to attach the clumping additive to the surface of the absorbent material.

19 Claims, No Drawings

ULTRA LIGHTWEIGHT CLAY AND POLYMER HIGH PERFORMANCE CLUMPING CAT LITTER

RELATED APPLICATIONS AND INCORPORATION BY REFERENCE

This application claims benefit of U.S. provisional application Ser. No. 62/036,327, filed Aug. 12, 2014, herein incorporated by reference.

All documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention. More specifically, all referenced documents are incorporated by reference to the same extent as if each individual document was specifically and individually indicated to be incorporated by reference.

FIELD OF THE INVENTION

This invention relates to a formulation and process for making a lightweight clumping cat litter with virtually no dust, low tracking, and odor control comparable to current clay-based litters.

BACKGROUND OF THE INVENTION

Materials used for cat litter vary significantly in weight but are generally used by volume. There are several lightweight mineral-based litters available on the market today. Some of them are physical blends of clumping clays and non-clumping clays or similar minerals, some are agglomerated clumping clay and non-clumping mixtures, and others are non-clumping clays (or other mineral blends) blended with clumping additives. There is also a small segment of the cat litter category that consists of clumping alternative litters that often contain non-clay materials such as: crystals, wood chips, paper, grain, nut shells, etc. and gelling agents to provide clumping. Desirable characteristics of cat litter includes its acceptability to cats as a litter, lack of degradation, and that it is itself not a food source for bacteria or fungi that may be introduced by urine or feces into the cat box. Additionally, the cat litter needs to be safe and effective for use in residential environments. Finally, a satisfactory litter must have sufficient density not to stick easily to cat fur or leave the cat box due to activity in or near the box ("tracking").

Clay litters have been known to offer superior performance over alternative litters due to unique properties including absorption, the lack of presence of a food source for bacteria or fungi, larger surface area and porosity. Sodium bentonite based litters have been very popular due to the natural clumping properties of sodium bentonite. Non-clumping clays are often significantly lighter in weight than sodium bentonite but require an addition of clumping additive to provide adequate clump strength in scoopable litter formulations. The clumping additive is typically present in a form of a fine powder that is dry-blended with litter particles. The clumping additive tends to segregate from larger particles and creates high dust levels during pouring or scooping. Due to a non-uniform distribution of the clumping additive, the clumps vary in strength and tend to break easily.

Citation or identification of any document in this application is not an admission that such document is available as prior art to the present invention.

SUMMARY OF THE INVENTION

This invention related to a formulation and process for making a lightweight, clumping absorbent material, in particular, a cat litter, which retains the odor control benefits of a mineral-based litter with virtually no dust and low tracking. The formulations described in this document utilize a tackifying agent to attach the clumping additive to the surface of absorbent granules. The formulation of the present invention is lightweight, nearly dust-free, controls odors well, and offers comparable clumping performance to the current preferred clumping litter, sodium bentonite. The invention further relates to a formulation and processes for making said formulation possessing these properties.

The absorbent material may advantageously be any absorbent material that does not naturally clump, or that would benefit from an improved clump. In one embodiment, the material may be a clay or a mineral. Clay may refer to any type of clay, fuller's earth, or sorbent minerals, diatomaceous earths, silicates, zeolites, attapulgites, hormites, perlite, smectites, kaolinite, sepiolite, vermiculite, pumice, gypsum or combinations of these materials. The clay may be a calcium bentonite or palygorskite/attapulgite (attapulgite), which are preferred materials for the formulation.

The formulations provided for in the present application contemplate the use of tackifying agents. Tackifying agents are low-molecular weight compounds with a high glass transition temperature. Compounds in this class are used in formulations to increase adhesion and a have suitable viscosity. The viscosity of a tackifying agent should not exceed 6000 cPs at room temperature and their solid content should be 90% or less. Generally tackifying agents are water soluble or water dispersible with a "syrupy" type form and can be used diluted or undiluted. All values for viscosity are at room temperature.

Preferred tackifying agents may be low viscosity (<1300 cPs, advantageously 630-1250 cPs) sodium polyacrylate solutions in water, advantageously with 30% to 55% solid content, further advantageously with 40% to 55% solid content, more advantageously 40.9% to 45.5% solid content. Examples of tackifying agents include, but are not limited to, polyols (e.g., sorbitol), sodium polyacrylate, polyvinyl alcohols, polyvinyl acetates, corn syrup, and molasses.

Non-cat litter applications are also contemplated for the present invention. The present invention can be used in any situations where a clumping form of liquid absorption is required, such as but not limited to, other animal litter applications, use as an oil or liquid absorbent in industry applications, and use in instances where the creation of a solid is quickly required. For example, when this formulation is exposed to liquid, it would cause the material to instantly clump and create a temporary solid surface, which could have applications for temporary barriers, building materials or road surfaces.

Accordingly, it is an object of the invention to not encompass within the invention any previously known product, process of making the product, or method of using the product such that Applicants reserve the right and hereby disclose a disclaimer of any previously known product, process, or method. It is further noted that the invention does not intend to encompass within the scope of the invention any product, process, or making of the product or method of using the product, which does not meet the written description and enablement requirements of the USPTO (35 U.S.C. § 112, first paragraph) or the EPO (Article 83 of the EPC), such that Applicants reserve the right and hereby disclose a disclaimer of any previously described product, process of making the product, or method of using the product.

It is noted that in this disclosure and particularly in the claims and/or paragraphs, terms such as "comprises", "comprised", "comprising" and the like can have the meaning attributed to it in U.S. patent law; e.g., they can mean "includes", "included", "including", and the like; and that terms such as "consisting essentially of" and "consists essentially of" have the meaning ascribed to them in U.S. patent law, e.g., they allow for elements not explicitly recited, but exclude elements that are found in the prior art or that affect a basic or novel characteristic of the invention.

These and other embodiments are disclosed or are obvious from and encompassed by, the following Detailed Description.

DETAILED DESCRIPTION OF THE INVENTION

Several formulations were screened for performance prior to the below examples being selected. Selected formulations are based on clump strength, dust, and clumping additive adherence optimization.

A low viscosity sodium polyacrylate solution (40.9-45.5%) in water is a very effective adhesive for attaching a clumping additive powder and clay dust to larger clay granules resulting in a virtually dust-free product.

Advantageously, the polyacrylate is a salt, such as an alkali metal or ammonium salt. The salt is preferably sodium polyacrylate and may have a chemical formula of [—$CH_2$—$CH(COONa)$—]$_n$. Other salts that are contemplated include, but are not limited to, potassium, lithium and ammonium salts.

Addition of a sodium polyacrylate solution allows for even distribution of clumping additive.

A sodium polyacrylate solution allows for loading large amounts of clumping additive (advantageously 10%) onto clay without the effects of puddling after the product is wetted (as physical blends of clumping additives can cause puddling).

Sodium polyacrylate solution helps to retain moisture in the clumps and prevents them from drying out and becoming brittle.

The polyacrylate of the present invention may be a polyacrylic acid or carbomer and may refer to a synthetic high molecular weight polymer of acrylic acid. The polyacrylate of the present invention may be a homopolymer of an acrylic acid or crosslinked with, for example, an allyl ether. The polyacrylate of the present invention may be referred to by various carbomer codes (such as, but not limited to, 910, 934, 940, 941 and 934) which may indicate molecular weight as well as specific components. In an advantageous embodiment, the polyacrylate is sodium polyacrylate.

The ideal particle size distribution of clay for this formulation style may be between about 10 and about 30 mesh. Clay particles smaller than 30 mesh start to stick together after sodium polyacrylate is added, reducing the clumping additive retention. With clay particles larger than 10 mesh, the clumps become elongated and may stick to surfaces, such as the bottom of the litter pan. The particle size distribution of clay may be about 10 mesh, about 11 mesh, about 12 mesh, about 13 mesh, about 14 mesh, about 15 mesh, about 16 mesh, about 17 mesh, about 18 mesh, about 19 mesh, about 20 mesh, about 21 mesh, about 22 mesh, about 23 mesh, about 24 mesh, about 25 mesh, about 26 mesh, about 27 mesh, about 28 mesh, about 29 mesh or about 30 mesh.

To achieve the highest clumping additive retention, the initial free moisture level of clay may be between about 10% and about 13%. The initial free moisture level of clay may be about 10%, about 11%, about 12% or about 13%.

As used herein, the absorbent mineral may advantageously be any absorbent material that does not naturally clump, or that would benefit from an improved clump. In one embodiment, the material may be a clay or a mineral. Clay may refer to any type of clay, fuller's earth, or sorbent minerals, diatomaceous earths, silicates, zeolites, attapulgites, hormites, perlite, smectites, kaolinite, sepiolite, vermiculite, pumice, gypsum or combinations of these materials.

Silicates may refer to any compound containing an anionic silicon. Most silicates are oxides, however, other anions, such as hexaluorosilicate and orthosilicate, are also contemplated. Silicates may be composed largely of silicon and oxygen, with the addition of ions such as, but not limited to, aluminium, magnesium, iron and calcium. Some important rock-forming silicates include, but are not limited to, the feldspars, quartz, olivines, pyroxenes, amphiboles, garnets and micas. Silicates may include phyllosicilates, nesosilicates, cyclosilicates, sorosilicates, inosilicates and tectosilicates. Phyllosilicates may include micas, chlorites, kaolinites, smectites (bentonite clays), hormites, talcs and serpentinites. Tectosilicates may include quartz, zeolites and feldspars.

In an advantageous embodiment, the clay is a calcium bentonite, a sodium bentonite, or an attapulgite. Calcium bentonite and attapulgite clays may be the most suitable materials for the formulation.

Calcium bentonite (CBEN) may be a heat treated calcium bentonite (HCBN). The attapulgite may be an attapulgite-type Fullers Earth (AFE), a heat treated Fullers Earth (HTF) or an acid-treated attapulgite (ATA).

Other materials that may be used in litter compositions of the present invention include, but are not limited to, smectites, attapulgite, fuller's earth, diatomaceous earth, kaolinite, sepiolite, zeolite, shale, expanded shale, vermiculite, pumice, perlite, expanded perlite, gypsum, beads (polyethylene, polystyrene, polypropylene), cloth, cotton, straw, cellulose, bark, poultry litter, reconstituted materials and combinations of materials such as cellulose and fertilizer, recycled wastes such as Milorganite, organic material such as barley grains, corn kernels, corn cob granules, wheat grains, coffee beans, rice grains, nut shells, paper, wood fiber, wood pulp, wood shavings, wood chips, wood flour, sawdust, etc., pieces and parts thereof, reconstituted parts thereof and mixtures thereof. In one embodiment, the materials may have a bulk density less than that of the sodium bentonite in a litter mixture. In one embodiment, a filler of the present invention may be a granular filler.

As used herein, a lightweight litter has a lighter bulk density as compared to sodium bentonite, but has sufficient density to not "track".

Clumping agents may be any of many polymers, e.g. guar, a cellulose (such as CMC or cellulose ethers) gums (such as gum gatti, guar gum, a xantham gum), xantham, a water-absorbent polymer, a starch or a polyethylene oxide. Clumping agents may be water-soluble gums, dry particulate cellulosic ethers or water-absorbent polymers. Preferred clumping agents may be sodium carboxymethylcellulose (CMC), methyl hydroxyethyl cellulose (MHEC) and/or xanthan gum. CMC is a cellulose derivative with carboxymethyl groups bound to some of the hydroxyl groups of the glucopyranose monomers that make up the cellulose backbone and is often used as its sodium salt, sodium carboxymethyl cellulose. MHEC is a derivative of hydroxyethl cellulose with alkyl side chains. Preferred clumping agents may be sodium carboxymethyl cellulose (CMC) and methyl hydroxyethyl cellulose (MHEC).

Preferred tackifying agents may be low viscosity (630-1250 cPs) sodium polyacrylate solutions in water, advantageously with 30% to 55% solid content, further advantageously with 40% to 55% solid content, more advantageously 40.9% to 45.5% solid content.

Litter compositions of the present invention may include dedusting agents. Examples of dedusting agents that may be included in a litter composition of the present invention include sodium polyacrylate, polytetrafluoroethylene (PTFE), oils, water, glycerols, glycols, polyvinyl alcohol, polyvinyl acetate, polymers, silicones, calcium chloride, foams, etc.

A litter of the present invention may include various other additives such as odor control additives, odor masking agents, odor delaying agents, emulsifiers, fixatives, indicators, pesticides, insecticides, herbicides, attractants, repellants, sanitizers, emollients, humectants, dessicants, dyes, pigments, etc. Examples of odor control additives that may be included in a litter composition of the present invention include biocides, urease inhibitors, iodine, chlorophyllin sodium copper salts, probiotics, enzymes, baking soda, borate, carbon, zeolites, salts, ethyl paraben, methyl paraben, calcium propionate, aldehydes (benzaldehyde, heptaldehyde, undecalcatone, benzyl cinnamate, cinnamaldehyde, citral, vanillin, coumarin, undecanal, etc.). Examples of odor masking agents that may be included in a litter composition of the present invention include fragrances such as citrus, floral (lavender), green, fruity, herbaceous, musk, oriental, woody, etc. An odor control system comprising an antimicrobial agent, a urease inhibitor, fragrance or a combination thereof, may be very effective in delaying the ammonia gas formation.

The invention further provides for a lightweight formulation of an animal litter, in particular a cat litter, which has high clumping strength, and essentially dust-free. Typical formulations of lightweight cat litters lack high clump strength. As defined in this invention, a lightweight litter is a litter possessing a density lower than that of 100% sodium bentonite (e.g., 63 lbs/ft$^3$). As essentially dust-free or low dust animal litter is one that exhibits a dust index of ≤0.5 as measured with an optical dust box, a procedure which is described in G. R. Goss and F. J. Reisch, 1989, "A Technique for Dust Measurement," Pesticide Formulation/Application Systems: 8th vol., Hovde/Beestman eds, ASTM STP 980, American Society for Testing and Materials, Philadephia, Pa., pp. 98-112. A hard clumping litter as defined in this invention is one that possesses a clump strength of ≤1.3 at 1 minute, 1 hour, 24 hours, and 72 hours as determined by the Standard Drop Test described below. The present application addresses a formulation and processes for making said formulation with these properties.

For purposes of the present invention, the term "clump strength" refers to the numerical value of average clump strength for a clump of litter material formed by exposing the litter material to a wetting agent approximating urine. In a Standard Drop Method Test, to measure clump strength of litter formulations an aluminum pan may be placed under a dropping device. The aluminum pan may include one or more sheets of paper product, such as a paper towel, as a liner. A small depression, approximately 1 cm, may be made in a flat pile of a litter to be tested. 20 ml of a wetting agent may be poured over the test litter. After 30 seconds a clump may be removed from the test litter and placed on a swinging platform of a dropping device with the bottom side of the clump down. Prior to the clump being placed on the swinging platform, the swinging platform may be raised by a user to be horizontal relative to the inner horizontal surface of the pan. The user releases the swinging platform allowing the clump to free fall into an aluminum pan placed exactly 12 inches (30.5 cm) below. Next, the clump is visually examined for breakage and assigned a rating on a scale from 1 to 3:1: clump intact, no breakage; 2: slight breakage (clumps breaks into 2 pieces); and 3: moderate breakage (clump breaks into more than 2 pieces). The test may be repeated on 2 more clumps and the average rating of all 3 clumps is reported.

An objective of a moisture study was to determine the effect of the free moisture content in attaching CMC to litter particles with sodium polyacrylate solution.

Materials used include a 10/24-mesh montmorillonite—TEST #S1, a 10/24-mesh attapulgite TEST #S2, another 10/24-mesh (montmorillonite_TEST #S3, another 10/24-mesh montmorillonite—TEST #S4 and a 10/24-mesh amorphous opaline silica—TEST #S5.

All test materials were ground and screened to achieve similar particle size distribution (Table #1). The test materials were then adjusted to free moisture levels ranging from 6 to 15% in 1% increments. After equilibrating overnight in tightly closed plastic containers, a small batch of finished formulation (sodium polyacrylate and CMC) was prepared using moisture equilibrated clays (Table #2).

The batches were prepared in a table top KitchenAid mixer with a beater paddle attachment. First, the appropriate amount of test material (94.8 in$^3$) was added to the mixing bowl and the sodium polyacrylate solution was added right on top. The bowl was then placed in the mixer assembly and the mixing was initiated at the speed setting #1. After exactly one minute, the mixer was stopped and the pre-weighed CMC powder was added to the test material-sodium polyacrylate mixture. The mixing was resumed at the speed setting of 1 for an additional 1 minute. The material was then transferred to a 1-gallon plastic container and capped tightly. After 4 days, the material was split 3 times using the sample splitter to obtain a sample of approximately 125 grams.

Split portions of each batch were screened using the RoTap mechanical shaker for 5 minutes and standard Tyler mesh screens arranged in the following order from top to bottom: 8, 10, 12, 14, 16, 18, 20, 30, 40, 50, 60, 100-mesh and pan. The CMC retention (% CMC attached to test material particles) was calculated based on the amount of material passing through the 100 mesh screen.

When sodium polyacrylate solution is mixed with the test material it causes the test material to swell and increase in volume. The sodium polyacrylate also creates a sticky surface for the clumping additive to adhere to. Timing is very important in this process. It is important that the sodium polyacrylate solution be distributed evenly on particles before the clumping powder is added. The clumping additive should be added at the peak of the swelling of the test material. If too much time passes before the clumping powder is added, the test material will begin to absorb the sodium polyacrylate solution and the clumping additive attachment will not be successful, resulting in a dusty product.

TABLE #1

Initial Clay Particle Size Distribution

|  | S1 | S2 | S3 | S4 | S5 |
|---|---|---|---|---|---|
| Bulk density, lbs/ft3: | 40.2 | 35.0 | 37.5 | 37.8 | 38.3 |
| Particle size distribution, %: | | | | | |
| 8 | 0.0 | 0.2 | 0.0 | 0.0 | 0.3 |
| 10 | 0.1 | 0.0 | 0.0 | 0.1 | 0.3 |
| 12 | 4.2 | 2.6 | 8.3 | 8.4 | 16.2 |
| 14 | 18.3 | 30.0 | 25.4 | 27.6 | 29.3 |
| 16 | 20.9 | 23.9 | 19.4 | 20.4 | 18.8 |
| 18 | 23.5 | 20.2 | 17.7 | 16.4 | 14.5 |
| 20 | 20.6 | 15.9 | 15.7 | 13.3 | 12.2 |
| 25 | 10.7 | 5.7 | 13.2 | 10.2 | 7.9 |
| 30 | 1.5 | 0.9 | 0.1 | 3.2 | 0.5 |
| 40 | 0.1 | 0.1 | 0.1 | 0.3 | 0.0 |
| 60 | 0.1 | 0.4 | 0.0 | 0.1 | 0.0 |
| 100 | 0.0 | 0.0 | 0.0 | 0.0 | 0.0 |
| −100 | 0.0 | 0.2 | 0.1 | 0.1 | 0.1 |
| Totals: | 100.0 | 100.0 | 100.0 | 100.0 | 100.0 |

TABLE #2

Clumping litter formulations

|  | % | g |
|---|---|---|
| S1 | | |
| 10/24 BL-clay | 92.6 | 1000 |
| Sodium Polyacrylate solution | 4.6 | 50 |
| CMC | 2.8 | 30 |
| Totals: | 100.0 | 1080 |
| S2 | | |
| 10/24 GA-clay | 91.6 | 869 |
| Sodium Polyacrylate solution | 5.3 | 50 |
| CMC | 3.2 | 30 |
| Totals: | 100.0 | 949 |
| S3 | | |
| 10/24 RP-clay | 92.1 | 932 |
| Sodium Polyacrylate solution | 4.9 | 50 |
| CMC | 3.0 | 30 |
| Totals: | 100.0 | 1012 |
| S4 | | |
| 10/24 MD-clay | 92.2 | 940 |
| Sodium Polyacrylate solution | 4.9 | 50 |
| CMC | 2.9 | 30 |
| Totals: | 100.0 | 1020 |
| S5 | | |
| 10/24 TF-clay | 92.2 | 951 |
| Sodium Polyacrylate solution | 4.8 | 50 |
| CMC | 2.9 | 30 |
| Totals: | 100.0 | 1031 |

Results: The study has shown that the initial moisture level of the test material is critical in the process of attaching the clumping additive to particles with sodium polyacrylate solution. The S1 and S2 test materials were found to be the most suitable for this process because they retained the most clumping additive over the widest range of moisture levels (Table #3).

TABLE #3

| S1 10/24 @ % moisture: | 6% | 7% | 8% | 9% | 10% | 11% | 12% | 13% | 14% | 15% |
|---|---|---|---|---|---|---|---|---|---|---|
| CMC retention %: | 4.7 | 24.0 | 65.3 | 78.4 | 79.0 | 80.1 | 81.1 | 79.9 | 75.2 | 51.3 |

| S2 10/24 @% moisture: | 6% | 7% | 8% | 9% | 10% | 11% | 12% | 13% | 14% | 15% |
|---|---|---|---|---|---|---|---|---|---|---|
| CMC retention %: | −1.8* | 47.0 | 83.3 | 83.6 | 87.4 | 85.1 | 76.8 | 56.1 | −3.2 | 7.1 |

| S3 10/24 @% moisture: | 6% | 7% | 8% | 9% | 10% | 11% | 12% | 13% | 14% | 15% |
|---|---|---|---|---|---|---|---|---|---|---|
| CMC retention %: | −14.6* | 25.6 | 53.1 | 58.9 | 70.7 | 73.4 | 70.9 | 62.0 | 52.5 | 40.2 |

| S4 10/24 @% moisture: | 6% | 7% | 8% | 9% | 10% | 11% | 12% | 13% | 14% | 15% |
|---|---|---|---|---|---|---|---|---|---|---|
| CMC retention %: | −2.5* | 26.5 | 59.6 | 68.0 | 74.5 | 67.3 | 62.4 | 64.0 | 45.2 | 36.8 |

| S5 10/24 @% moisture: | 13% | 15% | 17.5% | **20% | ***22.5% | ***25% | ****27.5% | ****30% | N/A | N/A |
|---|---|---|---|---|---|---|---|---|---|---|
| CMC retention %: | −70.3* | −43.5* | −29.7* | 66.0 | 94.3 | 98.4 | N/A | N/A | N/A | N/A |

| >70% | high CMC retention |
|---|---|
| 50–70% | moderate CMC retention |
| <50% | low CMC retention |

*The negative numbers signify the attrition of clay.

**The S5 clay was adjusted to higher moisture level because even at 15% moisture, the clumping additive did not attach to S5.

***At the moisture level of 22.5% and 25%, the CMC started to swell and collect on >100 mesh screens.

****At moisture levels exceeded 25%, the S5 test material was no longer free-flowing and particle size could not be determined.

Materials Used included 10/24-mesh S1 test material at 11% F.M. & 10/24-mesh S2 test material at 10% F.M.

Procedure: All batches (Table #4) were prepared in the KitchenAid mixer with a beater paddle attachment. First, the test material was added to the mixing bowl. The sodium polyacrylate solution was added right on top. The mixing was initiated at the speed setting of 1. After 30 seconds the mixer was stopped and the clumping additive was added. The mixing was resumed at the speed setting of 1 for an additional 30 seconds.

Observation: In this experiment, the amount of time before and after the addition of clumping aid was reduced from 1 minute to 30 seconds to improve the adhesion of clumping additive to the test material. Adhesion was judged by observation. This was especially important for formulations where the amount of sodium polyacrylate solution was reduced.

All formulas tried in this study produced a satisfactory product with low density, virtually no dust and strong clumping (Table #5).

TABLE #5

| Sample Test | Cell #1 (S1 full strength formula with CMC) | Cell #2 (S1 low cost formula with CMC) | Cell #3 (S1 low cost formula with MHEC) |
|---|---|---|---|
| Bulk density, lbs/ft$^3$: | 37.7 | 38.5 | 38.8 |
| Dust index: | 0.1 | 0.0 | 0.0 |
| Dust classification: | dust-free | dust-free | dust-free |
| Clump strength (S.U.): | | | |
| 30 sec. | 1.0 | 1.0 | 1.0 |
| 1 hr. | 1.0 | 1.0 | 1.0 |

TABLE #4

| Cell #1* (formula 1 with CMC): | | | | Cell #2 (formula 2 with CMC) | | | |
|---|---|---|---|---|---|---|---|
| Ingredients: | % | Amt. | unit | Ingredients: | % | Amt. | unit |
| 10/24 BL-RVM clay @11% FM | 89.29 | 2000 | g | 10/24 BL-RVM clay @11% FM | 92.17 | 2000 | g |
| Slurry #4 | 2.68 | 60 | g | Slurry #4 | 2.76 | 60 | g |
| Fragrance slurry | 0.89 | 20 | g | Fragrance slurry | 0.92 | 20 | g |
| Sodium Polyacrylate solution | 4.46 | 100 | g | Sodium Polyacrylate solution | 2.76 | 60 | g |
| CMC | 2.68 | 60 | g | CMC | 1.38 | 30 | g |
| Totals: | 100 | 2240 | g | Totals: | 100 | 2170 | g |
| Fragrance slurry | | | | Fragrance slurry | | | |
| Water | 63 | 12.6 | g | Water | 63 | 12.6 | g |
| Tween 20 | 15 | 3 | g | Tween 20 | 15 | 3 | g |
| fragrance | 15 | 3 | g | fragrance | 15 | 3 | g |
| anti-microbial agent | 2 | 0.4 | g | anti-microbial agent | 2 | 0.4 | g |
| urease inhibitor | 4 | 0.8 | g | urease inhibitor | 4 | 0.8 | g |
| coloring agent | 1 | 0.2 | g | coloring agent | 1 | 0.2 | g |
| Totals: | 100 | 20 | g | Totals: | 100 | 20 | g |
| Slurry #4 | | | | Slurry #4 | | | |
| Water | 98 | 58.8 | g | Water | 98 | 58.8 | g |
| PTFE | 2 | 1.2 | g | PTFE | 2 | 1.2 | g |
| Totals: | 100 | 60 | g | Totals: | 100 | 60 | g |
| Cell #3 (formula 2 with MHEC): | | | | Cell #4 (formula 3 with CMC): | | | |
| Ingredients: | % | Amt. | unit | Ingredients: | % | Amt. | |
| 10/24 BL-RVM clay @11% FM | 92.17 | 2000 | g | 12/24 GA-RVM clay @10% FM | 90.47 | 1614 | |
| Slurry #4 | 2.76 | 60 | g | Slurry #4 | 3.36 | 60 | |
| Fragrance slurry | 0.92 | 20 | g | Fragrance slurry | 1.12 | 20 | |
| Sodium Polyacrylate solution | 2.76 | 60 | g | Sodium Polyacrylate solution | 3.36 | 60 | |
| MHEC | 1.38 | 30 | g | CMC | 1.68 | 30 | |
| Totals: | 100 | 2170 | g | Totals: | 100 | 1784 | |
| Fragrance slurry | | | | Fragrance slurry | | | |
| Water | 63 | 12.6 | g | Water | 63 | 12.6 | |
| Tween 20 | 15 | 3 | g | Tween 20 | 15 | 3 | |
| fragrance | 15 | 3 | g | fragrance | 15 | 3 | |
| anti-microbial agent | 2 | 0.4 | g | anti-microbial agent | 2 | 0.4 | |
| urease inhibitor | 4 | 0.8 | g | urease inhibitor | 4 | 0.8 | |
| coloring agent | 1 | 0.2 | g | coloring agent | 1 | 0.2 | |
| Totals: | 100 | 20 | g | Totals: | 100 | 20 | |
| Slurry #4 | | | | Slurry #4 | | | |
| Water | 98 | 58.8 | g | Water | 98 | 58.8 | |
| AD-10 | 2 | 1.2 | g | AD-10 | 2 | 1.2 | |
| Totals: | 100 | 60 | g | Totals: | 100 | 60 | |

*CMC is carboxymethylcellulose, Tween 20 is an emulsifier, an anti-microbial agent and a urease inhibitor are odor control additives, polytetrafluoroethylene (PTFE) is a dedusting agent.

TABLE #5-continued

| Sample Test | Cell #1 (S1 full strength formula with CMC) | Cell #2 (S1 low cost formula with CMC) | Cell #3 (S1 low cost formula with MHEC) |
|---|---|---|---|
| 24 hrs. | 1.0 | 1.0 | 1.0 |
| 48 hrs. | 1.0 | 1.0 | 1.0 |
| 72 hrs. | 1.0 | 1.0 | 1.0 |
| Average clump strength: | 1.0 | 1.0 | 1.0 |

An objective of an odor control study was to determine the ammonia control properties of the invention formulation.

Procedure: A batch of the BL full strength formula with CMC (Table #6) was prepared in the KitchenAid mixer with the beater paddle attachment. First, the clay was added to the mixing bowl. The sodium polyacrylate solution was added right on top. The mixing was initiated at the speed setting of 1. After 1 minute the mixer was stopped and the clumping additive was added. The mixing was resumed at the speed setting of 1 for an additional 1 minute.

A batch of inoculating solution (Table #7) was prepared in a high speed blender. A 100 g sample of the litter formulation was placed in three 16-oz wide mouth jars. The excess litter was added to each sample jar. After one minute, the excess litter not absorbed by the inoculating liquid was removed from each jar. The jars were capped with specially modified lids with an opening for the ammonia detection tube and anther one to allow for the air circulation. A brand new ammonia tube was inserted into each of the samples. The ammonia readings were taken every day until 100 ppm was formed.

TABLE #6

| Ingredients: | % | Amt. | unit |
|---|---|---|---|
| 10/24 S1 @11% FM | 89.29 | 2000 | g |
| Slurry #4 | 2.68 | 60 | g |
| Fragrance slurry | 0.89 | 20 | g |
| Sodium Polyacrylate soln. | 4.46 | 100 | g |
| CMC | 2.68 | 60 | g |
| Totals: | 100.00 | 2240 | g |
| Fragrance slurry | | | |
| Water | 63 | 12.6 | g |
| Tween 20 | 15 | 3.0 | g |
| fragrance | 15 | 3.0 | g |
| anti-microbial agent | 2 | 0.4 | g |
| urease inhibitor | 4 | 0.8 | g |
| coloring agent | 1 | 0.2 | g |
| Totals: | 100.00 | 20.0 | g |
| Slurry #4 | | | |
| Water | 98.0 | 58.8 | g |
| PTFE | 2.0 | 1.2 | g |
| Totals: | 100.0 | 60.0 | g |

TABLE #7

| Components: | % | wt., g |
|---|---|---|
| Water | 91.43 | 914.3 |
| Fresh cat feces | 1.00 | 10.0 |
| Urea | 5.22 | 52.2 |
| Ammonium phosphate dibasic | 0.70 | 7.0 |
| Sodium bisulfate | 0.45 | 4.5 |
| Ammonia | 0.33 | 3.3 |
| Potassium chloride | 0.32 | 3.2 |
| Sodium chloride | 0.27 | 2.7 |
| Creatinine | 0.18 | 1.8 |
| Magnesium chloride | 0.06 | 0.6 |
| Creatine | 0.03 | 0.3 |
| Calcium chloride | 0.02 | 0.2 |
| Total: | 100.00 | 1000.00 |

Observations: Every day after the inoculation, the jars were opened and smelled for the odors of ammonia and feces. The feces odor was not detectable at all by the tester and the ammonia odor was only detected after 13 days.

Results: It took 13 days for the formula to develop detectable ammonia levels, which is a very good indication of effective and long-lasting odor control (Table #8). Clay without fragrance and odor control additives normally develop 100 ppm ammonia in about 4 days.

TABLE #8

| Day #: | NH3, ppm |
|---|---|
| 0.0 | 0.0 |
| 1.0 | 0.0 |
| 3.9 | 0.0 |
| 4.9 | 0.0 |
| 7.0 | 0.0 |
| 7.9 | 8.3 |
| 11.0 | 43.3 |
| 13.7 | 118.3 |

A sodium polyacrylate study was carried out to determine the ideal properties of sodium polyacrylate to achieve the maximum clumping additive retention.

First, each polymer sample was used to prepare a batch of formulated product according to the formulation stated in Table #9. All batches were prepared in the Kitchen Aid mixer with a beater paddle attachment. First, the clay was added to the mixing bowl. The sodium polyacrylate solution was added right on top. The mixing was initiated at the speed setting of 1. After 30 seconds the mixer was stopped and the clumping additive was added. The mixing was resumed at the speed setting of 1 for an additional 30 seconds. Next, the batches were transferred into 1 gallon plastic container and capped. On the 4th day, each batch was split 3 times using the sample splitter to obtain a sample of approximately 125 grams.

TABLE 9

| S1 | % | g |
|---|---|---|
| 10/24 S1 | 95.2 | 1000 |
| Sodium Polyacrylate solution | 3.3 | 35 |
| CMC | 1.4 | 15 |
| Totals: | 100.0 | 1050 |

Split portions of each batch were screened using the RoTap mechanical shaker for 5 minutes and standard Tyler mesh screens arranged in the following order from top to bottom: 8, 10, 12, 14, 16, 18, 20, 30, 40, 50, 60, 100-mesh and pan. The CMC retention (% CMC attached to clay particles) was calculated based on the amount of material passing through the 100 mesh screen.

Next, the polymers with the highest CMC retention were used to prepare batches of material using MHEC as the clumping agent. The retention was determined using the exact same procedure as described above.

TABLE 10

| S1 | % | g |
|---|---|---|
| 10/24 S1 | 95.2 | 1000 |
| Sodium Polyacrylate solution | 3.3 | 35 |
| MHEC | 1.4 | 15 |
| Totals: | 100.0 | 1050 |

TABLE 11

| | sodium poly-acrylate 1 | sodium poly-acrylate 2 | sodium poly-acrylate 3 | sodium poly-acrylate 4 | sodium poly-acrylate 5 | sodium poly-acrylate 6 | sodium poly-acrylate 7 | sodium poly-acrylate 8 | sodium poly-acrylate 9 | sodium poly-acrylate 10 |
|---|---|---|---|---|---|---|---|---|---|---|
| sample wt, g: | 121.2 | 124.0 | 126.7 | 121.3 | 121.2 | 120.0 | 121.3 | 122.2 | 122.1 | 122.2 |
| −100-mesh: | 0.4 | 0.4 | 0.5 | 0.5 | 0.5 | 0.5 | 0.6 | 0.6 | 0.6 | 0.7 |
| g initial CMC: | 1.7 | 1.8 | 1.8 | 1.7 | 1.7 | 1.7 | 1.7 | 1.7 | 1.7 | 1.7 |
| g CMC retained: | 1.3 | 1.4 | 1.4 | 1.3 | 1.3 | 1.2 | 1.2 | 1.2 | 1.2 | 1.1 |
| % CMC retention: | 76.9 | 76.3 | 74.6 | 74.0 | 73.4 | 70.3 | 68.3 | 66.2 | 66.2 | 62.2 |

TABLE 12

| | sodium polyacrylate 3 | sodium polyacrylate 4 | sodium polyacrylate 1 | sodium polyacrylate 7 | sodium polyacrylate 5 | sodium polyacrylate 2 |
|---|---|---|---|---|---|---|
| sample wt, g: | 123 | 122.2 | 122.2 | 121.9 | 121.5 | 122.7 |
| −100-mesh | 0.17 | 0.18 | 0.19 | 0.23 | 0.24 | 0.29 |
| g initial MHEC | 1.76 | 1.75 | 1.75 | 1.74 | 1.74 | 1.75 |
| g MHEC retained: | 1.59 | 1.57 | 1.56 | 1.51 | 1.50 | 1.46 |
| % MHEC retention: | 90.3 | 89.7 | 89.1 | 86.8 | 86.2 | 83.5 |

All batches were also checked for clumping at 30 seconds, 1 hour, 24 and 72 hours (Table #13).

TABLE 13

| Clump strength with CMC: | sodium polyacrylate 3 | sodium polyacrylate 5 | sodium polyacrylate 7 | sodium polyacrylate 1 | sodium polyacrylate 2 | sodium polyacrylate 4 |
|---|---|---|---|---|---|---|
| 30 sec. | 1.0 | 1.0 | 1.7 | 1.7 | 2.3 | 1.0 |
| 1 hr. | 1.0 | 1.0 | 1.0 | 1.0 | 1.0 | 1.0 |
| 24 hrs. | 1.0 | 1.0 | 1.0 | 1.0 | 1.0 | 1.0 |
| 72 hrs. | 1.0 | 1.0 | 1.0 | 1.0 | 1.0 | 1.0 |
| Average: | 1.0 | 1.0 | 1.2 | 1.2 | 1.3 | 1.0 |
| Clump strength with MHEC: | sodium polyacrylate 3 | sodium polyacrylate 5 | sodium polyacrylate 7 | sodium polyacrylate 1 | sodium polyacrylate 2 | sodium polyacrylate 4 |
| 30 sec. | 1.0 | 1.0 | 1.0 | 1.0 | 1.0 | 1.0 |
| 1 hr. | 1.0 | 1.0 | 1.0 | 1.0 | 1.0 | 1.0 |
| 24 hrs. | 1.0 | 1.0 | 1.0 | 1.0 | 1.0 | 1.0 |
| 72 hrs. | 1.0 | 1.0 | 1.0 | 1.0 | 1.0 | 1.0 |
| Average: | 1.0 | 1.0 | 1.0 | 1.0 | 1.0 | 1.0 |

Finally, each sodium polyacrylate solution was tested for viscosity and % solids (Table #14). The viscosity was determined with the Brookfield viscometer at room temperature. The solids content was determined by placing the polymer samples in 105° C. oven overnight. (data not shown)

Sodium polyacrylate dispersions with viscosities between 630 and 1210 cPs and solids content between 40.9 and 45.5% were found to be the most effective adhesives for CMC and MHEC.

Sodium polyacrylate dispersions with viscosities between 630 and 1210 cPs and solids content between 40.9 and 45.5% were found to be the most effective adhesives for CMC.

Sodium polyacrylate solutions with the viscosities of 5650 cPs or more are not recommended because they are difficult to distribute evenly on clay and form lumps in the finished product. Sodium polyacrylate solutions with the viscosities of 50 cPs of less are not recommended because they do not create a tacky surface on clay for the clumping additive to adhere to.

Low viscosity sodium polyacrylate solutions in water with the viscosities of 630 cPs to 1210 cPs and solids content of 40.9% to 45.5% are very effective adhesives for attaching a clumping additive powder and clay dust to larger clay granules resulting in a virtually dust-free product.

Addition of a sodium polyacrylate solution allows for even distribution of clumping additive.

A sodium polyacrylate solution allows for loading large amounts of clumping additive (up to 10%) onto clay without the effects of puddling after the product is wetted (Physical blends of clumping additives can cause puddling).

Sodium polyacrylate solution helps to retain moisture by the clumps and prevents them from drying out and becoming brittle.

The ideal particle size distribution of clay for this formulation style is between 10 and 30 mesh. Clay particles smaller than 30 mesh, start to stick together after sodium polyacrylate is added, reducing the clumping additive retention. With clay particles larger than 10 mesh, the clumps become elongated and may stick to the bottom of the litter pan.

To achieve the highest clumping additive retention, the initial free moisture level of clay should be between 10% and 13%.

Calcium bentonite and attapulgite clays are the most suitable materials for this formulation style.

The odor control system consisting of an anti-microbial agent, an urease inhibitor and fragrance is very effective in delaying the ammonia gas formation.

Clumping agents can be any of many polymers, e.g. guar, CMC, cellulose ethers, gums, etc.

This invention may further be described by the following numbered paragraphs:

1 A clumping formulation comprising an absorbent material, a tackifying agent and a clumping agent.

2 The clumping formulation of paragraph #1, wherein the clumping formulation is a lightweight formulation.

3 The clumping formulation of paragraph #1 or 2, wherein the tackifying agent is capable of binding the clumping agent to the absorbent material.

4 The clumping formulation of any one of paragraphs #1-3, wherein the absorbent material is a mineral.

5 The clumping formulation of paragraph #4, wherein the mineral is a calcium bentonite or an attapulgite.

6 The clumping formulation of any one of paragraph #1-5, wherein the absorbent material has a particle size between about 10 and about 30 mesh.

7 The clumping formulation of any one of paragraph #1-6, wherein the absorbent material has an initial free moisture level of less than 15%.

8 The clumping formulation of any one of paragraph #1-6, wherein the absorbent material has an initial free moisture level of between about 1% and about 13%.

9 The clumping formulation of any one of paragraph #1-6, wherein the absorbent material has an initial free moisture level of between about 2% and about 13%.

10 The clumping formulation of any one of paragraph #1-9, wherein the tackifying agent is a low viscosity solution.

11 The clumping formulation of paragraph #10, wherein the low viscosity solution has a viscosity of about 500 cPs to about 1500 cPs.

12 The clumping formulation of paragraph #10, wherein the low viscosity solution has a viscosity of about 630 cPs to about 1250 cPs.

13 The clumping formulation paragraph #1-12, wherein the tackifying agent is a polyacrylate corn syrup, a polyol, polyvinyl alcohols, polyvinyl aceptates, or molasses.

14 The clumping formulation of paragraph #13, wherein the polyacrylate is a sodium polyacrylate.

15 The clumping formulation of any one of paragraph #1-14, wherein the clumping agent is a guar, a cellulose, a cellulose ether, a gum, a guar gum, a xantham gum, a water-absorbent polymer, a starch, a polyethylene oxide or a combination thereof.

16 The clumping formulation of paragraph #15, wherein the cellulose ether is a dry particulate cellulosic ether.

17 The clumping formulation of paragraph #15, wherein the clumping agent is a sodium carboxymethyl cellulose (CMC).

18 The clumping formulation of paragraph #15, wherein the clumping agent is a methyl hydroxyethyl cellulose (MHEC).

19 The clumping formulation of any one of paragraph #1-18 further comprising a dedusting agent.

20 The formulation of paragraph #19, wherein the dedusting agent is selected from the group consisting of sodium polyacrylate, polytetrafluoroethylene (PTFE), oils, water, glycerols, glycols, polyvinyl alcohol, polyvinyl acetate, polymers, silicones, calcium chloride and foams.

21 The formulation of any one of paragraph #1-20 further comprising an odor control system.

22 The clumping formulation of paragraph #21, wherein the odor control system comprises an anti-microbial agent, borate, baking soda, a urease inhibitor, sodium benzoate, methyl paraben, ethyl paraben, calcium propionate, fragrance or a combination thereof.

23 The formulation of paragraph #21 or #22 wherein the odor control system delays and/or masks ammonia gas formation.

24. A cat litter comprising the formulation of any one of paragraph #1-22.

25. A method of absorbing liquid comprising adding the formulation or litter of any one of paragraph #1-23 to a liquid, thereby clumping the liquid into a solid.

Although the present invention and its advantages have been described in detail, it should be understood that various changes, substitutions and alterations can be made herein without departing from the spirit and scope of the invention as defined in the appended claims.

***

Having thus described in detail preferred embodiments of the present invention, it is to be understood that the invention defined by the above paragraphs is not to be limited to particular details set forth in the above description as many apparent variations thereof are possible without departing from the spirit or scope of the present invention.

What is claimed is:

1. A clumping formulation comprising:
   (a) an absorbent material, wherein the absorbent material has a particle size between about 10 and about 30 mesh and an initial free moisture level of about 10% to about 13%;
   (b) a tackifying agent, wherein the tackifying agent is a low viscosity solution from about 500 cPs to about 1500 cPs; and
   (c) a clumping agent
   wherein the tackifying agent is attached to and is evenly distributed on the surface of the absorbent material and wherein the tackifying agent binds the clumping agent to the absorbent material.

2. The clumping formulation of claim 1, wherein the absorbent material is a mineral.

3. The clumping formulation of claim 2, wherein the mineral is a calcium bentonite or an attapulgite.

4. The clumping formulation of claim 1, wherein the low viscosity solution has a viscosity of about 630 cPs to about 1250 cPs.

5. The clumping formulation of claim 1 wherein the tackifying agent is a polyacrylate, corn syrup, a polyol, polyvinyl alcohols, polyvinyl acetates, or molasses.

6. The clumping formulation of claim 5, wherein the polyacrylate is a sodium polyacrylate.

7. The clumping formulation of claim 1, wherein the clumping agent is a guar, a cellulose, a cellulose ether, a gum, a guar gum, a xantham gum, a water-absorbent polymer, a starch a polyethylene oxide or a combination thereof.

8. The clumping formulation of claim 7, wherein the cellulose ether is a dry particulate cellulosic ether.

9. The clumping formulation of claim 7, wherein the clumping agent is a sodium carboxymethyl cellulose (CMC).

10. The clumping formulation of claim 7, wherein the clumping agent is a methyl hydroxyethyl cellulose (MHEC).

11. The clumping formulation of claim 1 which further comprising a dedusting agent.

12. The clumping formulation of claim 11, wherein the dedusting agent is selected from the group consisting of sodium polyacrylate, polytetrafluoroethylene (PTFE), oils, water, glycerols, glycols, polyvinyl alcohol, polyvinyl acetate, polymers, silicones, calcium chloride and foams.

13. The clumping formulation of claim 1 which further comprises an odor control system.

14. The clumping formulation of claim 13, wherein the odor control system comprises an anti-microbial agent, borate, baking soda, a urease inhibitor, sodium benzoate, methyl paraben, ethyl paraben, calcium propionate, fragrance or a combination thereof.

15. The clumping formulation claim 13 wherein the odor control system delays and/or masks ammonia gas formation.

16. A cat litter comprising the clumping formulation of claim 1.

17. The clumping formulation of claim 1 wherein the tackifying agent is a polyacrylate, corn syrup, polyvinyl acetates, or molasses.

18. A clumping formulation comprising:
 (a) an absorbent material which is calcium bentonite or an attapulgite and has a particle size between about 10 and about 30 mesh and an initial free moisture level of about 10% to about 13%;
 (b) a tackifying agent, wherein the tackifying agent is a low viscosity solution of sodium polyacrylate in water with a 30% to 55% solid content and has a viscosity form about from about 500 cPs to about 1250 cPs; and,
 (c) a clumping agent is a guar, a cellulose, a cellulose ether, a gum, a guar gum, a xantham gum, a water-absorbent polymer, a starch a polyethylene oxide or a combination thereof wherein the tackifying agent is attached to and is evenly distributed on the surface of the absorbent material and wherein the tackifying agent binds the clumping agent to the absorbent material.

19. The clumping formulation of claim 18, wherein the absorbent material is sodium carboxymethyl cellulose (CMC) or methyl hydroxyethyl cellulose (MHEC).

* * * * *